(12) United States Patent
Lubivy (10) Patent No.: US 10,489,327 B2
(45) Date of Patent: Nov. 26, 2019

(54) SYSTEM AND METHOD OF AN IMPROVED LINE CARD DESIGN

(71) Applicant: Arista Networks, Inc., Santa Clara, CA (US)

(72) Inventor: Alexander Lubivy, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 555 days.

(21) Appl. No.: 15/019,941

(22) Filed: Feb. 9, 2016

(65) Prior Publication Data

US 2016/0357694 A1 Dec. 8, 2016

Related U.S. Application Data

(60) Provisional application No. 62/171,228, filed on Jun. 4, 2015.

(51) Int. Cl.
*H05K 7/10* (2006.01)
*G06F 13/40* (2006.01)
(Continued)

(52) U.S. Cl.
CPC .......... *G06F 13/4004* (2013.01); *G06F 13/36* (2013.01); *H04L 49/30* (2013.01);
(Continued)

(58) Field of Classification Search
None
See application file for complete search history.

(56) References Cited

U.S. PATENT DOCUMENTS 5,218,567 A * 6/1993 Suzuki ................ G06F 12/0895
365/177
6,813,510 B1 * 11/2004 Kunzinger ........... H03G 3/3052
327/91
(Continued)

OTHER PUBLICATIONS

PCT International Search Report and Written Opinion for PCT International Appln No. PCT/US2016/035590 dated Sep. 12, 2016. (11 pages).
(Continued)

*Primary Examiner* — Henry Tsai
*Assistant Examiner* — Dean Phan
(74) *Attorney, Agent, or Firm* — Fountainhead Law Group PC (57) ABSTRACT

A method and apparatus of a network element that includes a line card without retimers between an ASIC and either a network connector or mid-plane connector is described. In an exemplary embodiment, the network element includes a line card coupled to a fabric card. The line card includes a plurality of mid-place connectors, a plurality of network connectors, and a plurality of application-specific integrated circuits (ASICs). In addition, one of plurality the mid-plane connectors couple the line card with the fabric card. Furthermore, the plurality of network connectors to communicate data with devices coupled to the network element and each of the plurality of ASICs process the data. The line card further is configured such that each of the of plurality of ASICs is coupled to each of the plurality of mid-plane connectors by a different mid-plane connector—ASIC path without boosting a signal on that path and each of the plurality of ASICs is further coupled to each of the plurality of network connectors by a different network connector—ASIC path without boosting a signal on that path.

19 Claims, 7 Drawing Sheets

(51) Int. Cl.
*G06F 13/36* (2006.01)
*H04L 12/931* (2013.01)
*H04L 12/935* (2013.01)

(52) U.S. Cl.
CPC .............. *H04L 49/40* (2013.01); *Y02D 10/14* (2018.01); *Y02D 10/151* (2018.01)

(56) References Cited

U.S. PATENT DOCUMENTS

| | | |
|---|---|---|
| 7,406,038 B1 | 7/2008 | Oelke et al. |
| 7,760,647 B2 | 7/2010 | Li et al. |
| 2011/0302346 A1* | 12/2011 | Vahdat .................... H04L 49/40 710/301 |
| 2012/0243553 A1* | 9/2012 | Rabinovich ........... G06F 13/128 370/463 |
| 2013/0272643 A1 | 10/2013 | Traverso et al. |
| 2014/0341225 A1 | 11/2014 | Subramanian et al. |
| 2016/0191313 A1* | 6/2016 | Chen .................. H04L 41/0816 370/315 |

OTHER PUBLICATIONS

PCT International Search Report and Written Opinion for PCT International Appln No. PCT/US2016/035590 dated Dec. 14, 2017. (8 pages).

\* cited by examiner

SYSTEM AND METHOD OF AN IMPROVED LINE CARD DESIGN

RELATED APPLICATIONS

Applicant claims the benefit of priority of prior, provisional application Ser. No. 62/171,228, filed Jun. 4, 2015, the entirety of which is incorporated by reference.

FIELD OF INVENTION

This invention relates generally to data networking, and more particularly, to a line card design of the network element that does not use retimers between an application specific integrated circuit and either a network connector or mid-plane connector.

BACKGROUND OF THE INVENTION

A network element can include multiple line cards that are used to communicate data with other devices coupled to this network element. Each line card can include multiple network connectors to communicate the data. For example, a line card can include many different types of network connectors (e.g., 10/100 megabits per second (Mbs), one gigabit per second (Gbps), 10 Gbps, 40 Gbps and/or 100 Gbps Ethernet interfaces). Each of these interfaces can be either a copper or optical interface.

The multiple line card network element can include a set of fabric cards that are coupled to the line cards. The design of the line card includes a set of application-specific integrated circuits (ASICs) that are coupled to the network connectors, where the ASICs processed the data that the network connectors communicate. For example, one or more of the ASICs can make forwarding decisions for the data received on the line card network connectors. The ASICs can forward the data to the fabric cards via set of mid-plane connectors that couple the line card with the fabric cards.

Each of the ASICs has a separate path to each of the mid-plane connectors and the network connectors. In order for the ASICs to successively forward data through the network connectors and mid-plane connectors, the signal loss along these separate paths needs to be within a required tolerance. For example, each of the ASICs outputs an electrical signal along these paths at a certain signal strength. Furthermore, each of the network connectors and mid-plane connectors requires a minimum signal strength of this electrical signal, in order for the data to be successfully transmitted via the network connector or the mid-plane connector. To overcome the signal loss, a network element designer would place re-timers along the paths so as to boost the electrical signals and make sure any signal loss is within the required tolerance.

SUMMARY OF THE DESCRIPTION

A method and apparatus of a network element that includes a line card without retimers between an ASIC and either a network connector or mid-plane connector is described. In an exemplary embodiment, the network element includes a line card coupled to a fabric card. The line card includes a plurality of mid-place connectors, a plurality of network connectors, and a plurality of application-specific integrated circuits (ASICs). In addition, one of plurality the mid-plane connectors couple the line card with the fabric card. Furthermore, the plurality of network connectors is to communicate data with devices coupled to the network element and each of the plurality of ASICs is to process the data. The line card further is configured such that each of the of plurality of ASICs is coupled to each of the plurality of mid-plane connectors by a different mid-plane connector—ASIC path without boosting a signal on that path and each of the plurality of ASICs is further coupled to each of the plurality of network connectors by a different network connector—ASIC path without boosting a signal on that path.

In another embodiment, a method of manufacturing a line card is described. In an exemplary embodiment, the method couples a plurality of mid-plane connectors to a line card printed circuit board (PCB). The method further couples a plurality of network connectors to the line card PCB. In addition, the method places a plurality of ASICs on the line card PCB where each of plurality of ASICs is placed close enough to each of the plurality of mid-plane connectors such that a mid-plane ASIC path can be laid out without boosting a signal on that mid-plane ASIC path and each of the plurality of ASICs is further close enough to each of the plurality of network connectors such that a network connector ASIC path can be laid out without boosting a signal on that network connector ASIC path.

In a further embodiment, a line card is described. In an exemplary embodiment, the line includes a PCB and an ASIC module, where the ASIC module is coupled to the PCB. The ASIC module further includes an ASIC and a memory module, where a control channel and a data channel couples the ASIC and memory module. Furthermore, the each of the control channel and the data channel has the same length. In addition, one of the control channel and the data channel is laid out on top of the PCB and the other of the control channel and the data channel is laid out through the surface of the PCB.

In another embodiment, a method of manufacturing a line is described. In an exemplary embodiment, the method couples an ASIC module to a PCB. In addition, the ASIC module includes an ASIC and a memory module. The method further couples the ASIC and the memory module with a control channel and a data channel. The method couples the ASIC and the memory module by laying out one of the control channel and the data channel on top of the PCB, and laying out the other of the control channel and the data channel through the surface of the PCB, wherein each of the control channel and the data channel have the same length Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

A method and apparatus of a network element that includes a line card without retimers between an ASIC and either a network connector or mid-plane connector is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a network element that includes a line card without retimers between an ASIC and either a network connector or mid-plane connector is described. In one embodiment, the network element includes the line card that is coupled to one or more fabric cards. The line card includes multiple network connectors that communicate data with one or more other devices coupled to the line card. In one embodiment, the line card includes 36 100 Gbps network connectors. The line card further includes multiple ASICs coupled to the network connections, where the ASICs process the data received or transmitted by the network connectors. In addition, the ASICs forward data to multiple mid-plan connectors, which couple the line to the one or more fabric card.

In one embodiment, and in order to reduce the power requirements and increase the mean time between failure (MTBF) of the line card, each path (or connection) between the ASIC and the network connectors or mid-plane connector does not have a retimer or other component that boosts the electrical signal on this path. For example and in one embodiment, if the maximum signal loss allowed between an ASIC and mid-plane connector is 30 dB and the loss rate for the PCB is 0.7 dB/inch, the path is to be no longer than 42.7 inches. Furthermore, if the maximum signal loss allowed between an ASIC and network connector is 5 dB and the loss rate for the PCB is 0.7 dB/inch, the connection is to be no longer than 7.1 inches.

Figure 1A:
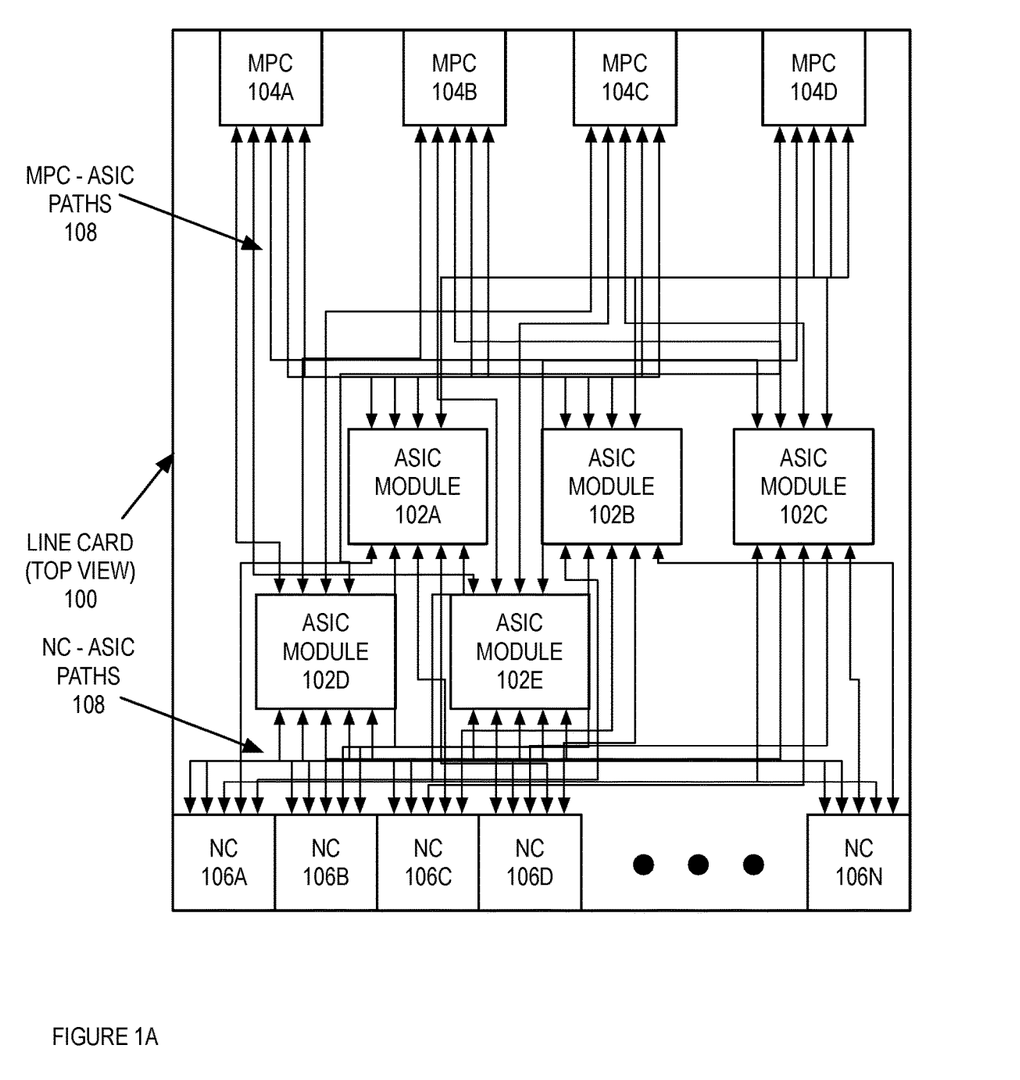
FIG. 1A is a block diagram of one embodiment of a line card that includes multiple ASICs coupled to multiple network connectors and mid-plane connectors.

FIG. 1A is a block diagram of one embodiment of a line card that includes multiple ASICs coupled to multiple network connectors and mid-plane connectors. In FIG. 1A, the line card 100 includes multiple network connectors 106A-N that communicate data with devices coupled to the line card 100 and ASIC modules 102A-E that processes the data received on the network connectors 106A-N and communicates data with the fabric cards (not illustrated) via the mid-plane connectors 104A-D that couple the line card 100 with the fabric cards. While in one embodiment, a network connector 106A-N is an Ethernet connector of a certain bandwidth (e.g., 10/100 megabits per second (Mbs), one gigabit per second (Gbps), 10 Gbps, 40 Gbps, and/or 100 Gbps Ethernet interfaces), in alternate embodiments, the network connector 106A-N can be a different type of network connector. In one embodiment, each of the network connectors 106A-N is either an electrical or optical interface. For example and in one embodiment, the network connector can be a 100 Gbps quad small form-factor pluggable+ (QSFP+) connector. Furthermore, while in one embodiment, each of the ASIC modules 102A-E includes an ASIC to process the data received on the network connectors 106A-N, such as to process packets received on these interfaces, in alternate embodiments, the ASIC modules 102A-E include a packet processor to process the received packets. In one embodiment, each ASIC module 102A-E is coupled to the network connectors 106A-N via a network interface (not illustrated). In another embodiment, each ASIC module is coupled to the mid-plane connector 104A-D via a fabric interface (not illustrate). While in one embodiment, five ASICs 102A-E, four mid-plane connectors 104A-D, and a number of network connectors 106A-N is illustrated. In alternate embodiments, a line card can be more or less for each of the ASICs, mid-plane connectors, and/or network connectors. For example and in one embodiment, a line card can have six ASICs, size mid-plane connectors, and 36 100 Gbps network connectors. In one embodiment, the network element can be a switch, router, hub, bridge, gateway, etc., or any type of device that can communicate data packets with a network using a line card.

For each combination of ASIC module 102A-E and mid-plane connector 104A-D, there is a separate mid-plane connector—ASIC path 108 that connects these two components. For example and in one embodiment, with five ASIC modules 102A-E and four mid-plane connectors 104A-D, there are 20 different mid-plane connector—ASIC paths 108. Furthermore, for each combination of ASIC module 102A-E and network connector 106A-N, there is a separate network connector—ASIC path 110 that connects these two components. For example and in one embodiment, with five ASIC modules 102A-E and 36 network connectors 106A-N, there are 180 different network connector—ASIC paths 110. Each of these paths, will have a signal loss from the ASIC module 102A-E to either the mid-plane connector 104A-D or network connector 106A-N. Furthermore, each of the network connectors 106A-N and the mid-plane connectors 104A-D requires a minimum signal strength of an electrical signal at the end of these paths in order for data to be successfully transmitted via the network connector 106A-N or the mid-plane connector 104A-D. For example and in one embodiment, if each of the network connectors 106A-N is a 100 Gbps electrical interface, the signal being transmitted out of this network connector 106A-N needs to be 30 dB to satisfy the 802.3bj standard. In addition and in this example, the mid-plane connector 104A-D may require a signal strength of 5 dB to forward data to the fabric cards. If each of the ASIC modules outputs an electrical signal with the strength of 35 dB, then each of the network connector—ASIC paths 110 can have a signal loss of no more than 5 dB. Similarly, each of the mid-plane connector—ASIC paths 108 can have a signal loss of no more than 30 dB.

One way to reduce the signal loss on either of the paths 108 or 110 is the use of retimers. A retimer is a component that boosts the electrical signal along one of the paths. Thus, a retimer can be used for each of the paths 108 or 110 to boost the signal along these paths. However, because a retimer boosts an electrical signal, this re-timer requires power to boost the signal. Thus, the use of retimers along each of the paths adds to the power consumption needed by the line card 100. For example, for five ASIC modules 102A-E coupled to four mid-plane connectors 104A-D and 36 network connectors 106A-N, 20 retimers are used along the mid-plane—ASIC paths 108 and 180 retimers are used on the network connectors—ASIC paths 110. This added power consumption requirement by using retimers is compounded as a line card uses higher bandwidth network connectors. For example and in one embodiment, by using 36 100 Gbps QSFP+ network connectors instead of 36 40 Gbps QSFP network connectors for the line card 100, a power requirement for a similarly designed line card would increase by 2-2.5 times.

In one embodiment, instead of using the retimers along the paths 108 or 110, by laying out the ASIC modules 102A-E closer to the network connectors 106A-N and using a low loss printed circuit board (PCB) for the line card 100, the signal loss along the any of the paths 108 can be reduced so that retimers are not required. In one embodiment, the PCB can have a loss rate of 0.7 dB per inch or less. By using this type of PCB, the ASIC modules 102A-E can be placed closer to the network connectors 106A-N such that the signal loss along the network connector—ASIC path 110 is less than 5 dB. For example and in one embodiment, if each of the network connector—ASIC paths 110 was less than 7.1 inches on a PCB with a loss rate of 0.7 dB/inch, then each of network connector—ASIC paths 110 would have a signal loss of less than 5 dB. In addition, the ASIC modules 102A-E should be close enough to the mid-plane connectors such that signal loss for the mid-plane connector—ASIC paths 108 is less than 30 dB. In this example, the ASIC modules should be within 42.7 inches, so that the signal loss along any of the mid-plane connector—ASIC paths 108 is less than 30 dB (for a PCB with a loss rate of 0.7 dB/inch). A sample layout of an ASIC module 102A-G, mid-plane connector 104A-D, and network connector 106A-N is further described in FIG. 2 below.

Figure 1B:
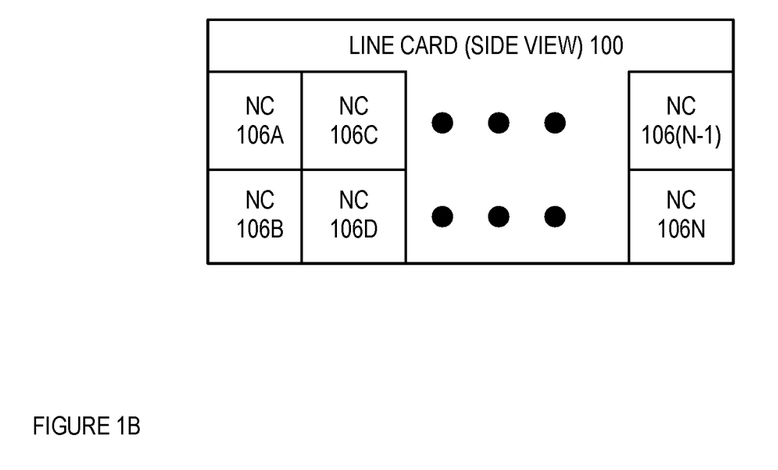
FIG. 1B is a block diagram of one embodiment of a side view of the line card.

FIG. 1B is a block diagram of one embodiment of a side view of the line card 100. In FIG. 1B, the side view of the line card 100 illustrates the arrangement of network connectors 106A-N. In one embodiment, the line card 100 includes 36 100 Gbps QSFP+ connectors. In this embodiment, the QSFP+ is a compact, hot-pluggable transceiver used for data communications and can provide four channels (4×25 Gbps) of data communications.

Figure 2:
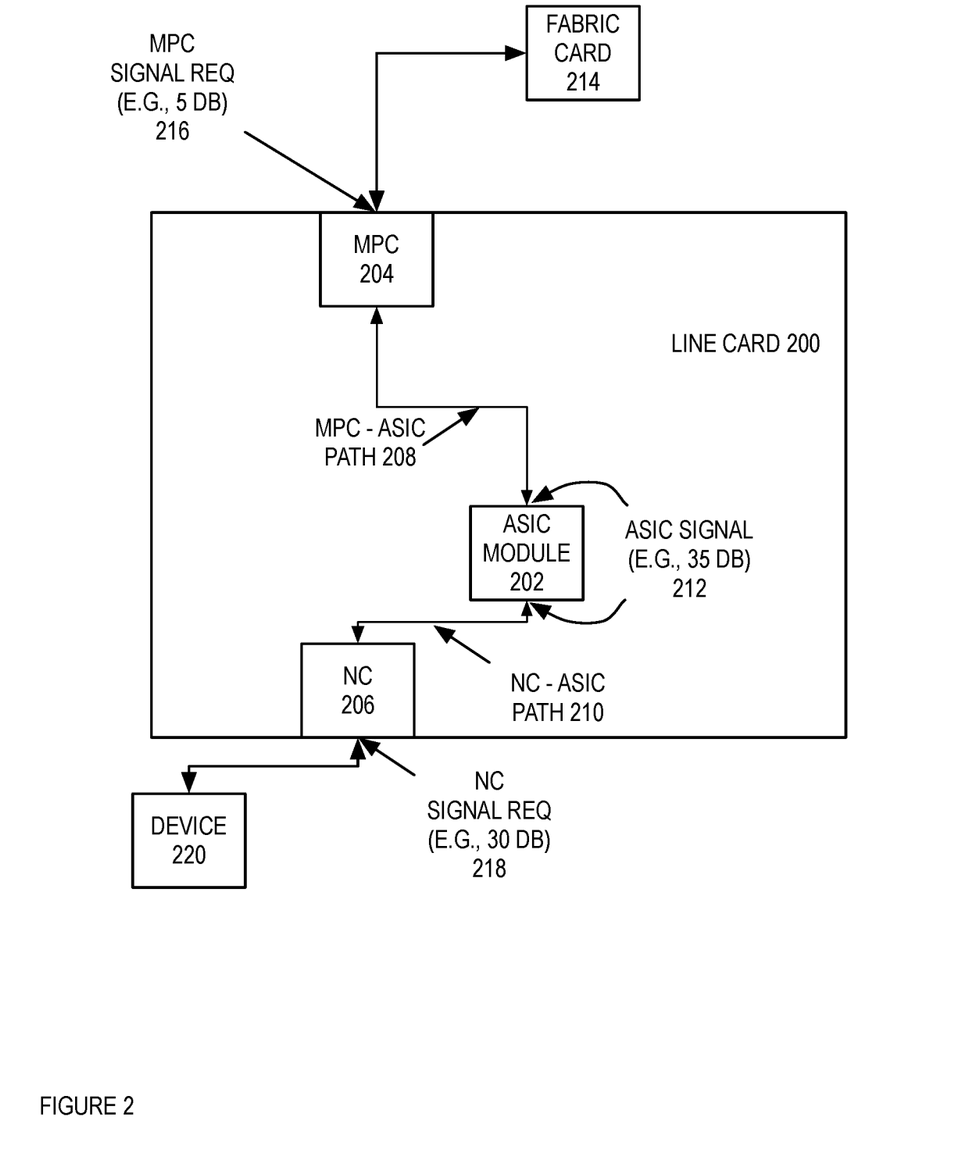
FIG. 2 is a block diagram of one embodiment of a line card with a path between ASIC module and a mid-plane connector and a path between the ASIC and a network connector.

FIG. 2 is a block diagram of one embodiment of a line card 100 with a path between ASIC module 202 and a mid-plane connector 204 and a path between the ASIC and a network connector 206. In FIG. 2, the line card 200 includes an ASIC module 202 that is coupled to a network connector 206 and a mid-plane connector 204 via a network connector—ASIC path 210 and a mid-plane connector—ASIC path 208, respectively. In one embodiment, the network connector—ASIC path 210 and the mid-plane connector—ASIC path 208 are the network connector—ASIC path and the mid-plane connector—ASIC path as described in FIG. 1A above. The network connector 206 is further coupled to a device 220. The device 220 is any type of device that can communicate network data with the line card (e.g., a personal computer, laptop, server, mobile device (e.g., phone, smartphone, personal gaming device, etc.), another network element, etc.). The mid-plane connector 204 is coupled to a fabric card 214. As described above in FIG. 1A, the network connector 206 and multi-playing connector 204 each have a requirement for signal strength so that these connectors can forward data successfully to the components or devices coupled to these connectors. In one embodiment, if the network connector 206 is a 100 Gbps electrical interface, this network connector 206 requires a 30 dB signal in order to successfully transmit data to the coupled device 220. Furthermore and in this embodiment, the mid-plane connector 204 requires a 5 dB signal in order to successfully forward data to the fabric card 214. If the ASIC module 202 outputs an ASIC signal that is 35 dB, the network connector—ASIC path 210 and mid-plane connector to ASIC path can tolerate a signal loss that is within 5 dB and 30 dB, respectively. By locating this ASIC module 202 close enough to each of the network connector 206 and mid-plane connector 204, and by using a low signal loss PCB board for the line card 200, the network connector—ASIC path 210 and mid-plane connector—ASIC path 208 can be constructed without the use of retimers along these paths. For example and in one embodiment, if the signal loss of the PCB board has a signal loss rate of 0.7 dB/inches, the network connector—ASIC path 210 can be less than 7.1 inches and the mid-plane connector—ASIC path 208 can be less than 42.8 inches, such that each of the network connector 206 and mid-plane connector 204 can have the required signal strength. Thus, a line card designer can optimize the placement of the ASIC module and design the line card without the use of retimers along the network connector—ASIC path 210 and the mid-plane connector—ASIC path 208. The line card without the use of the retimers reduces the power consumption requirement and increases the MTBF of the line because of the reduced power consumption.

Figure 3:
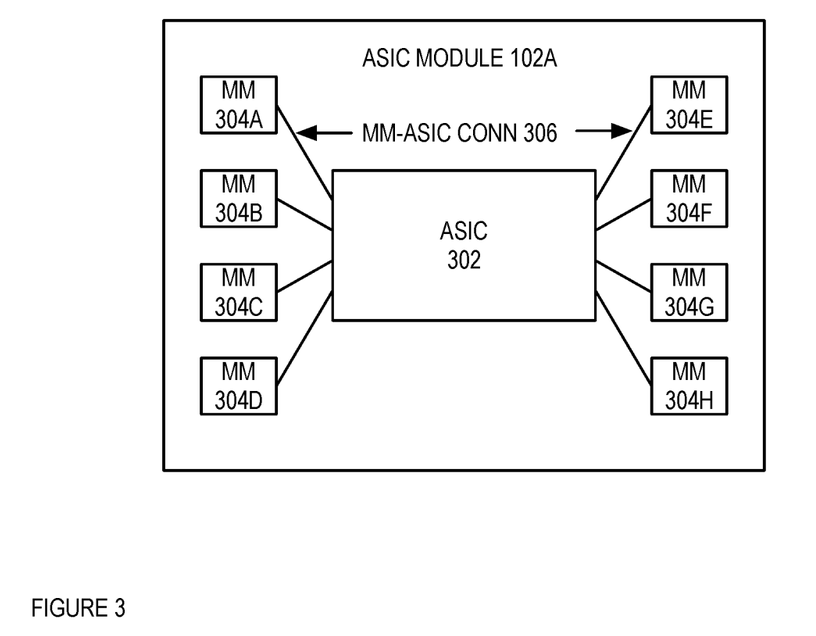
FIG. 3 is a block diagram of one embodiment of an ASIC module.

In one embodiment, compacting the size of the ASIC modules can help with optimizing the placement of the ASIC modules, because having a smaller ASIC module allows a greater freedom in placing that ASIC module on the line card. In one embodiment, each ASIC module includes the ASIC and multiple memory modules. In this embodiment, the memory modules are used to store data for the ASIC used in the data processing operations of that ASIC. These memory modules are connected to the ASIC module by a wire. FIG. 3 is a block diagram of one embodiment of an ASIC module 102A. In FIG. 3, the ASIC module 102A includes the ASIC 302 that is coupled to multiple memory modules 304A-H via a corresponding memory module—ASIC connection 306. In one embodiment, the memory modules 304A-H are each a memory chip that is used to store data for the ASIC 302. For example and in one embodiment, each memory module is a graphics double data rate (GDDR) memory, where each memory module—ASIC connection 306 between the corresponding memory module 304A-H and ASIC 302 is a 4 Gbps connection. In this example, the memory module—ASIC connection 306 for each of the connections between the memory modules 304A-H and the ASIC 302 has two channels: a control channel and a data channel. The control channel is used to send control messages between the ASIC 302 and the corresponding memory module 304A-H, with a data rate of 1 Gbps. The data channel is used to send data between the ASIC 302 and the corresponding memory module 304A-H, with a data rate of 4 Gbps. To send the data between the memory module 304A-H in the ASIC 302, the control messages and the data sent on these channels needs to be in phase. For the control message and the data to be in phase, the lengths of the connections of the two channels need to be the same. However, each of these two channels is on a separate wire, where the separate wires connected to different pins on the memory module 304A-H and the ASIC 302. Thus, a shortest distance path for each pin pair would result in different length wires and the control and data channels would be out of phase.

Figure 4:
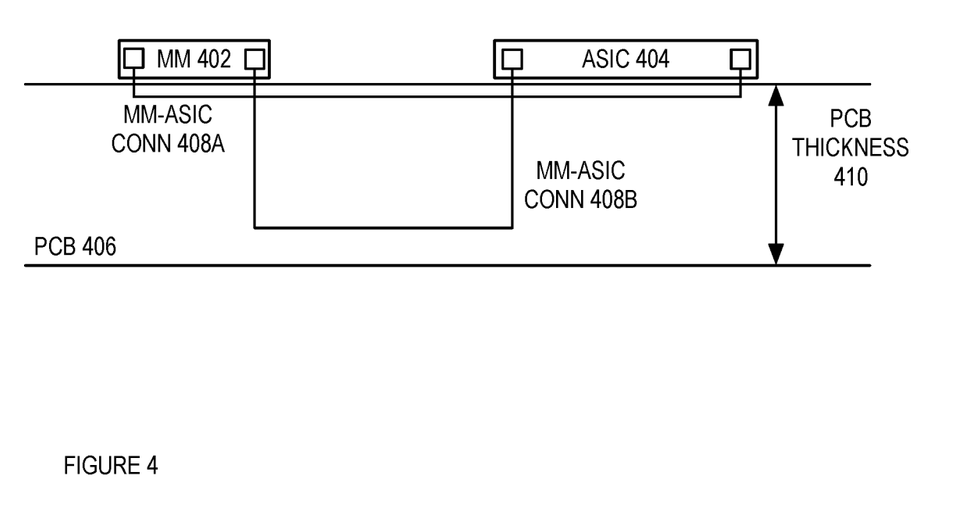
FIG. 4 is a block diagram of one embodiment of a memory module coupled to an ASIC.

In one embodiment, the shortest distance lengths between the control and data channel pins of the memory module and the ASIC are different lengths. In order to get the two channels in-phase, a longer wire can be laid down using the depth of the PCB board. FIG. 4 is a block diagram of one embodiment of a memory module coupled to an ASIC. In FIG. 4, the memory module 402 and ASIC 404 are mounted on the surface of the PCB 406. In addition, the memory module 402 is connected to the ASIC via two MM-ASIC connections 408A-B. In one embodiment, because of how the memory module 402 and ASIC 404 are laid out on the PCB 406, the distances between the pairs of pins of the memory module 402 and ASIC 404 are different. In order to make the distance of the two MM-ASIC connections 408A-B equal, the MM-ASIC connection 408A is laid out on or close to the surface of the PCB and the MM-ASIC connection 408B is laid out through the depth of the PCB (410) so that the length of each of the MM-ASIC connections 408A-B is the same.

Figure 5:
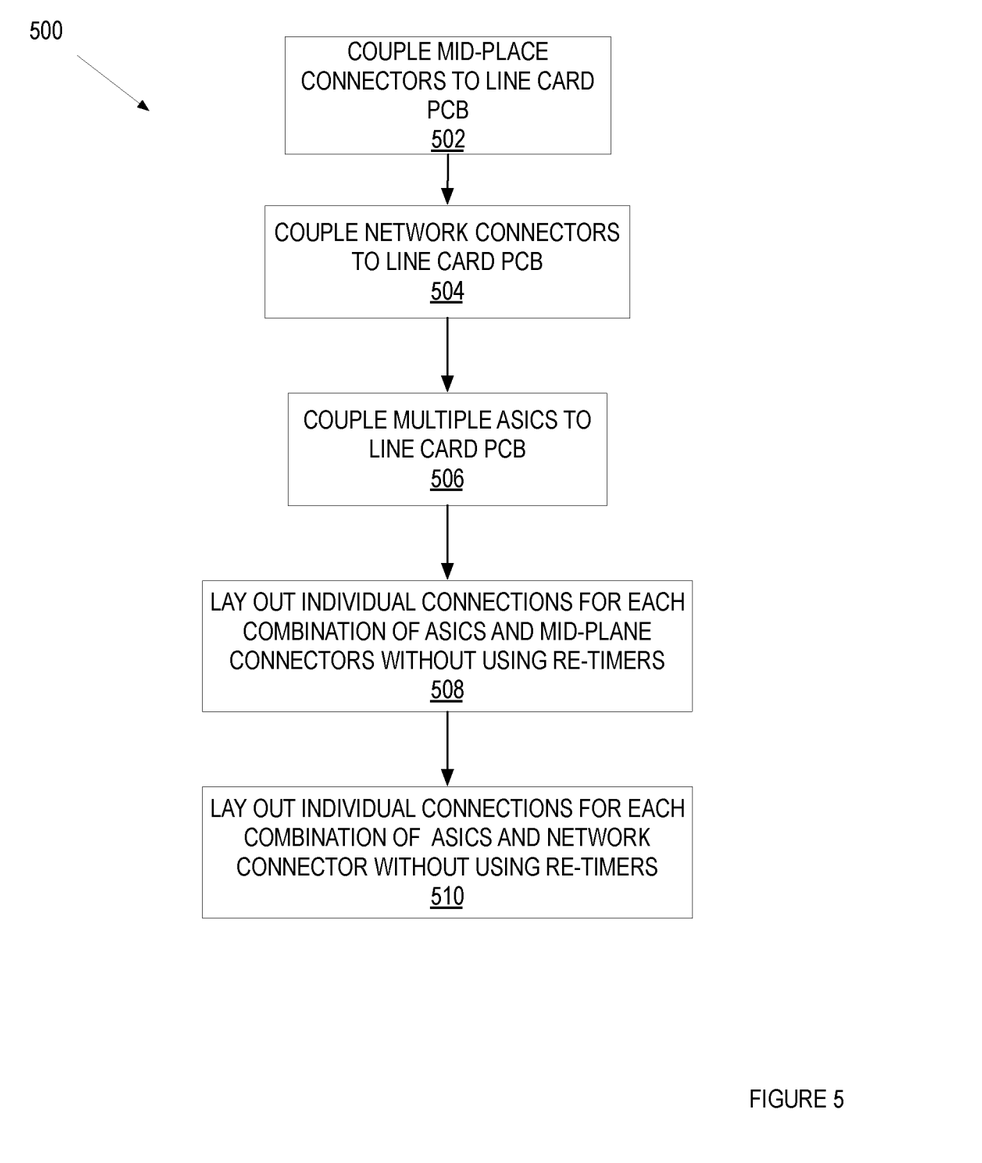
FIG. 5 is a flow diagram of one embodiment of a process to manufacture a line card without using retimers.

FIG. 5 is a flow diagram of one embodiment of a process 500 to manufacture a line card without using retimers. In FIG. 5, process 500 begins by coupling the multiple mid-plane connections to the line card PCB at block 502. In one embodiment, the mid-plane connectors are the mid-plane connectors as described in FIG. 1A. At block 504, process 500 couples the network connectors to the line card PCB. In one embodiment, the network connectors are the network connectors as described in FIG. 1A. For example and in one embodiment, process 500 couples 36 100 Gbps network connectors to the line card PCB. Process 500 couples the ASICs to the line card PCB at block 506. In one embodiment, process 500 couples the ASICs such that the signal loss for paths from the ASICs to the network connectors and the mid-plane connectors is small enough that retimers are not used. In this embodiment, because the network connectors have a higher signal requirement than the mid-plane connectors, process 500 couples the ASICs closer to the network connectors than the mid-plane connectors. At block 508, process 500 lays out the individual connections for each of the ASICs and the mid-plane connectors without using retimers. In one embodiment, there is a different connection for each unique pair of ASIC and mid-plane connectors. In this embodiment, process 500 lays out a new connections (e.g. wire) for each of the unique pair of ASIC and mid-plane connector. Furthermore, process 500 lays out this connection such that a retimer or other signal boost is not used in this connection. For example and in one embodiment, if the maximum signal loss allowed between an ASIC and mid-plane connector is 30 dB and the loss rate for the PCB is 0.7 dB/inch, process 500 lays out this connection to be no longer than 42.7 inches. At block 510, process 500 lays out the individual connections for each of the ASICs and the network connectors without using retimers. In one embodiment, there is a different connection for each unique pair of ASIC and network connectors. In this embodiment, process 500 lays out a new connection (e.g. wire) for each of the unique pair of ASIC and network connector. Furthermore, process 500 lays out this connection such that a retimer or other signal boost is not used in this connection. For example and in one embodiment, if the maximum signal loss allowed between an ASIC and network connector is 5 dB and the loss rate for the PCB is 0.7 dB/inch, process 500 lays out this connection to be no longer than 7.1 inches.

Figure 6:
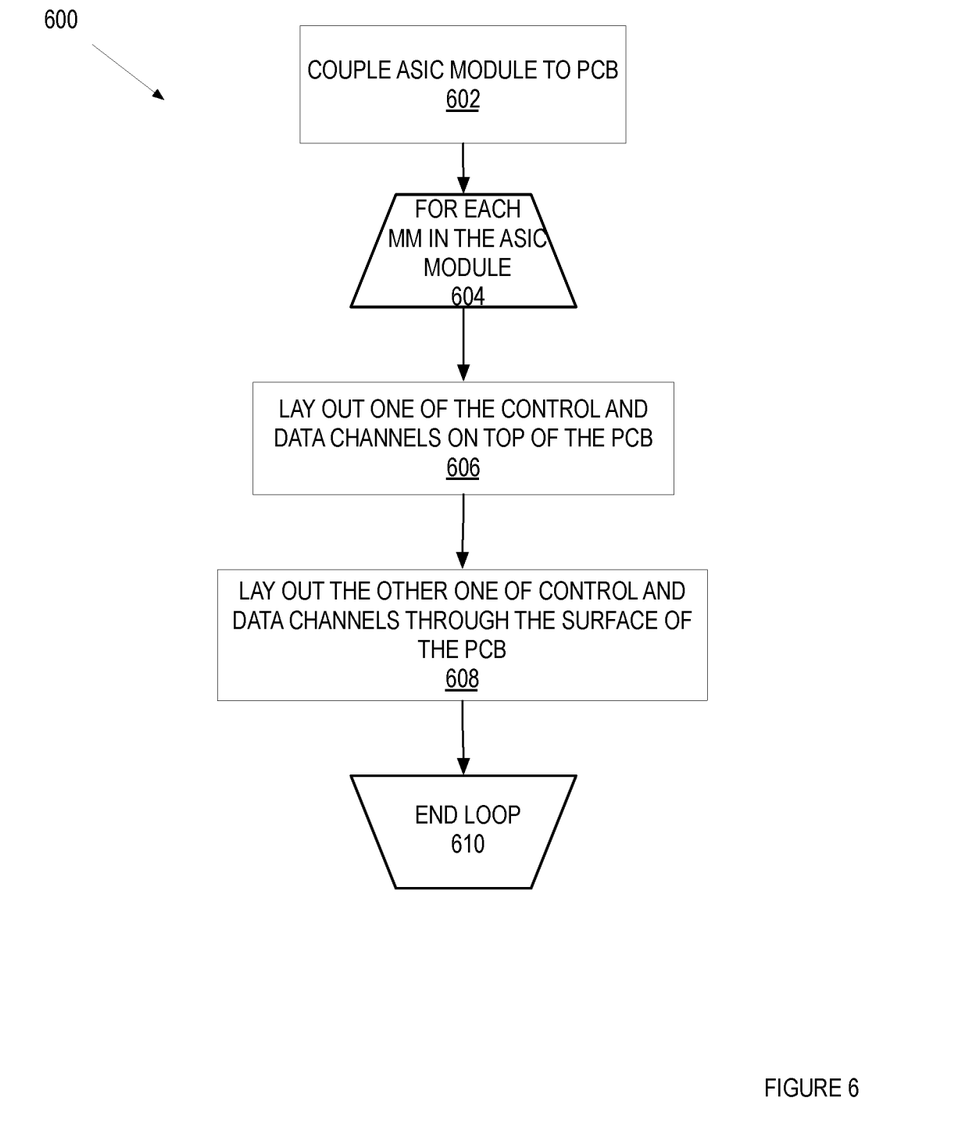
FIG. 6 is a flow diagram of one embodiment of a process to manufacture a line card with an ASIC module.

FIG. 6 is a flow diagram of one embodiment of a process 600 to manufacture a line card with an ASIC module. In FIG. 6, process 600 begins by coupling an ASIC module to a PCB at block 602. In one embodiment, the ASIC module includes an ASIC and multiple memory modules as described in FIG. 3 above. In this embodiment, the memory modules are used to store data for the ASIC used in the data processing operations of that ASIC. Process 600 further performs a processing loop (blocks 604-610) to couple the ASIC and each memory module with a different connection that includes separate control and data channels and each of these channels includes a wire of the same length as described in FIGS. 3 and 4 above. At block 606, process 600 lays out one of the control and data channels on top of the PCB. Process 600 lays out the other one of the control and data channels through the surface of the PCB at block 608. In one embodiment, process 600 lays out the channel for a pin of the ASIC module that is closer in proximity to the memory module through the surface of the PCB and lays out the other channel for a pin of the ASIC module that is further from the memory module on the top of the PCB as illustrated in FIG. 4. In this embodiment, by laying out on channel through the surface of the PCB and the other channel on top of the PCB, the two channels can have the same length wire. The processing loop ends at block 610.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "determining," "coupling," "forwarding," "laying," "identifying," "updating," "processing," "sending," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A network element comprising:
  a fabric card; and
  a line card, coupled to the fabric card, the line card including,
    a plurality of mid-plane connectors, wherein one of the plurality of mid-plane connectors is to couple the line card to the fabric card,
    a plurality of network connectors to communicate data with devices coupled to the network element, and
    a plurality of application specific integrated components (ASICs) to process the data, wherein each of the plurality of ASICs is positioned on the line card such that a signal loss between the ASIC and each of the plurality of mid-plane connectors is maintained below a first threshold and a signal loss between the ASIC and each of the plurality of network connectors is maintained below a second threshold, and wherein each of plurality of ASICs is coupled to each of the plurality of mid-plane connectors by a different mid-plane ASIC path without boosting a signal on that path and each of the plurality of ASICs is further coupled to each of the plurality of network connectors by a different network connector ASIC path without boosting a signal on that path.

2. The network element of claim 1, wherein each of the plurality of mid-plane connectors use a signal strength of at least 5 db to forward data to the fabric card.

3. The network element of claim 1, Wherein the signal loss on a mid-plane ASIC path between one of the plurality of ASICs and one of the plurality of mid-plane connectors is small enough the strength of the signal at this mid-plane connector is 5 db or greater.

4. The network element of claim 1, wherein each of the plurality of network connectors use a signal strength of at least 30 db to transmit data out that network connector.

5. The network element of claim 1, wherein the signal loss on a network connector ASIC path between one of the plurality of ASICs and one of the plurality of network connectors is small enough the strength of the signal at this network connector is 30 db or greater.

6. The network element of claim 1, wherein the line card includes a low loss printed circuit board.

7. The network element of claim 6, wherein the low loss printed circuit board has a signal loss of 0.7 db/inch or less.

8. The network element of claim 1, wherein each of the plurality of network connectors is selected form the group consisting of a 10/100 Mbps, 1 Gbps, 10 Gbps, 40 Gbps, and 100 Gbps Ethernet interface.

9. The network element of claim 1, wherein each of the plurality of network connectors is selected from the group consisting of an electrical and optical connector.

10. The network element of claim 1, wherein an ASIC makes a forwarding decision for the data received on one of the plurality of network connectors.

11. The network element of claim 1, wherein a signal loss on each of the mid-plane ASIC path results in a mid-plane signal at a corresponding mid-plane connector that is at or above a mid-plane signal threshold.

12. The network element of claim 11, wherein the mid-plane signal threshold is 5 db or greater.

13. The network element of claim 1, wherein a signal loss on each of the network connector ASIC path results in a network connector signal at a corresponding network connector that is at or above a network connector signal threshold.

14. The network element of claim 13, wherein the network connector signal threshold is 30 db or greater.

15. The network element of claim 1, wherein a path length between a selected one of the plurality of ASICs and a selected one of the plurality of mid-plane connectors is limited by a function of the signal strength of the given ASIC, a signal loss rate of a material of the line card, and the first threshold.

16. The network element of 1, wherein a path length between a selected one of the plurality of ASICs and a selected one of the plurality of network, connectors is limited by a function of the signal strength of the given ASIC, a signal loss rate of a material of the line card, and the second threshold.

17. A method of manufacturing a line card, the method comprising:
  coupling a plurality of mid-plane connectors to a line card printed circuit board (PCB);
  coupling a plurality of network connectors to the line card PCB; and
  placing a plurality of application specific integrated components (ASICs) on the line card PCB, wherein each of plurality of ASICs is placed close enough to each of the plurality of mid-plane connectors such that a mid-plane ASIC path has a signal loss below a first threshold and is laid out without using a re-timer for boosting a signal on that mid-plane ASIC path and each of the plurality of ASICs is further close enough to each of the plurality of network connectors such that a network connector ASIC path has a signal loss below a second threshold and is laid out without using a re-timer for boosting a signal on that network connector ASIC path.

18. The method of claim 17, further comprising:
  laying out a plurality of mid-plane ASIC paths between each of the plurality of mid-plane connectors and each of the plurality of ASICs, wherein each of the plurality of mid-plane ASIC paths does not use a re-timer for boosting a signal on that mid-plane ASIC path.

19. The method of claim 17, further comprising:
  laying out a plurality of network connector ASIC paths between each of the plurality of network connectors and each of the plurality of ASICs, wherein each of the plurality of network connector ASIC paths does not use a re-timer for boosting a signal on that network connector ASIC path.

* * * * *

UNITED STATES PATENT AND TRADEMARK OFFICE
CERTIFICATE OF CORRECTION

PATENT NO. : 10,489,327 B2  
APPLICATION NO. : 15/019941  
DATED : November 26, 2019  
INVENTOR(S) : Alexander Lubivy Page 1 of 2

It is certified that error appears in the above-identified patent and that said Letters Patent is hereby corrected as shown below:

On the Title Page

Item (57) Abstract, Line 6, "mid-place connectors," should be changed to --mid-plane connectors,--.

In the Drawings

Figure 1A, and on the Title Page, the illustrative figure, "NC-ASIC paths 108" should be changed to --NC-ASIC paths 110--;
Figure 5, box 502, "MID-PLACE" should be changed to --MID-PLANE--; and
Figure 5, box 510, "CONNECTOR" should be changed to --CONNECTORS--.

In the Specification

Column 1, Line 62, "mid-place connectors" should be changed to --mid-plane connectors--;
Column 2, Line 36, "a line" should be changed to --a line card--;
Column 3, Line 61, "mid-plan connectors" should be changed to --mid-plane connectors--;
Column 4, Line 44, "size mid-plane connectors" should be changed to --six mid-plane connectors--;
Column 5, Line 37, "along the any" should be changed to --along any--;
Column 6, Line 16, "multi-playing connectors" should be changed to --mid-plane connector--;
Column 6, Lines 21-22, "30 dB signal in order" should be changed to --30 dB signal 218 in order--;
Column 6, Line 24, "5 dB signal in order" should be changed to --5 dB signal 216 in order--;
Column 6, Line 26, "signal that is 35 dB" should be changed to --signal 212 that is 35 dB--; and
Column 8, Line 38, "out on channel" should be changed to --out one channel--.

In the Claims

Claim 1, Line 20 (Column 9, Line 45), "mid-plane ASIC path" should be changed to --mid-plane connector ASIC path--;
Claim 3, Line 1 (Column 9, Line 53), "Wherein" should be changed to --wherein--;

Signed and Sealed this  
Thirty-first Day of January, 2023

Katherine Kelly Vidal  
*Director of the United States Patent and Trademark Office*

CERTIFICATE OF CORRECTION (continued)
U.S. Pat. No. 10,489,327 B2

Claim 3, Line 2 (Column 9, Line 54), "mid-plane ASIC path" should be changed to --mid-plane connector ASIC path--;
Claim 8, Line 2 (Column 10, Line 4), "selected form" should be changed to --selected from--;
Claim 11, Line 2 (Column 10, Line 14), "mid-plane ASIC path" should be changed to --mid-plane connector ASIC path--;
Claim 11, Line 4 (Column 10, Line 16), "mid-plane signal threshold" should be changed to --mid-plane connector signal threshold--;
Claim 12, Lines 1-2 (Column 10, Lines 17-18), "mid-plane signal threshold" should be changed to --mid-plane connector signal threshold--;
Claim 16, Line 3 (Column 10, Line 34), "network, connectors" should be changed to --network connectors--;
Claim 17, Lines 10-11 (Column 10, Lines 49-50), "mid-plane ASIC path" should be changed to --mid-plane connector ASIC path--;
Claim 17, Line 13 (Column 10, Line 52), "mid-plane ASIC path" should be changed to --mid-plane connector ASIC path--;
Claim 18, Line 2 (Column 10, Line 59), "mid-plane ASIC paths" should be changed to --mid-plane connector ASIC paths--;
Claim 18, Line 5 (Column 10, Line 62), "mid-plane ASIC paths" should be changed to --mid-plane connector ASIC paths--; and
Claim 18, Line 6 (Column 10, Line 63), "mid-plane ASIC paths" should be changed to --mid-plane connector ASIC paths--.